United States Patent

Patapis

[15] 3,643,901
[45] Feb. 22, 1972

[54] DUCTED SPIKE DIFFUSER

[72] Inventor: Isidor C. Patapis, 4853 Cardell Ave. Apt. 1119, Bethesda, Md. 20014

[22] Filed: May 27, 1970

[21] Appl. No.: 40,948

[52] U.S. Cl............................................244/130
[51] Int. Cl..............................................B64c 23/04
[58] Field of Search............244/1 N, 53 B, 130; 137/15.1, 137/15.2; 60/270

[56] References Cited

UNITED STATES PATENTS

| | | | |
|---|---|---|---|
| 2,995,318 | 8/1961 | Schoppe | 244/14 |
| 2,631,425 | 3/1953 | Nordfors | 244/130 X |
| 3,175,355 | 3/1965 | Knauer | 244/53.8 X |
| 2,906,089 | 9/1959 | Kadosch et al. | 137/15.1 X |
| 3,334,485 | 8/1967 | Rhodes et al. | 60/270 X |

Primary Examiner—Milton Buchler
Assistant Examiner—Gregory W. O'Connor
Attorney—R. S. Sciascia, Q. E. Hodges and W. F. McCarthy

[57] ABSTRACT

A ducted spike diffuser for reducing forebody drag and rain erosion of blunt bodies operating at supersonic speeds. The spike has a directed conical front section to receive high-pressure oncoming air. This air is ejected at substantially right angles to the freeflow from an annular gap at the rear of the conical front section. This not only decreases pressure drag on the conical section but causes the conical bow shock wave-shear layer to occur radially further from the blunt body, resulting in better rain dispersion and decreased erosion of the blunt body.

7 Claims, 4 Drawing Figures

PATENTED FEB 22 1972 3,643,901

INVENTOR.
ISIDOR C. PATAPIS
BY
ATTORNEYS

DUCTED SPIKE DIFFUSER

The invention describer herein may be manufactured and used by or for The Government of the United States of America for Governmental purposes without the payment of any royalties thereon or therefor.

BACKGROUND OF THE INVENTION

The present invention relates broadly to supersonic flow control devices and more particularly to improvements in diffusing devices for controlling gas flows against blunt bodies operating at supersonic velocities.

For the optimum operating efficiency of a radar homing system in an aircraft or missile, the radiating components of the system, including the antenna and its radome, are placed in the foremost portions of the inner body of the aircraft or missile.

In its most effective form, the radome of the aircraft or missile is of a blunt body configuration. The blunt body shape will permit the greatest uniformity in the radome skin thickness thereby allowing for the uniform transmission and reception of the radar homing signals. A radome structured in the form of a hemisphere is considered an ideal shape for most radar systems. However, other configurations, such as a one-one tangent ogive, could also be employed without effectively reducing or otherwise interfering with the transmission and reception of radar homing intelligence.

The use of the hemisphere or the one-one tangent ogive, however, presents certain aerodynamic problems tending to compromise the aircraft or missile homing system which is dependent on the radar intelligence. The blunt body of the radome increases the drag forces operating upon the aircraft or missile and effects an impact momentum exchange with oncoming rain particles.

Prior art attempts to solve the aforementioned drag and raindrop momentum exchange problems have involved the utilization of a plain tip spike of a predetermined length, mounted axially to the aircraft or missile on the forward end of the radome and projecting well forward of the main body of the aircraft or missile.

The function of the prior art plain tip spikes are, essentially, to remove the detached portion of the bow shock wave acting on the aircraft or missile. Since the bow shock wave produces high pressure drag on the blunt body, the addition of the plain tip spike was an attempt to remove the detached portion of the wave and thereby diminish its effects.

Moreover, the use of the prior art plain tip spike was an effort to effect the dispersion of rain drops impinging on, and eroding the surface skin of the radome.

It was considered that, in using the plain tip spike, rain drops entered the shock wave at the tip of the spike and were subject to the compression shock waves at the spike tip. Similar compression waves were set up in the rain drops and, after a time, as the drops passed through the shock wave, they were dispersed to a fine vapor. This vaporizing process purportedly began at about 100$\mu$ seconds and was complete at about 700$\mu$ seconds depending on the Mach number at which the aircraft or missile was operating.

Droplets of rain were also intended to be deflected, along with the oncoming air flow, by the tip of the spike and the shear layer of the high velocity air so that as the droplet reached the main body of the radome, the impact angle of the droplet against the radome would be minimized to thereby reduce erosion of the radome body surface.

Prior art plain tip spikes have, however, been demonstrated to be relatively ineffective and, under most actual operating conditions, give drag coefficients not much different from the drag coefficients of the basic radome bodies. Moreover, under actual operating conditions, the radomes were still subject to varying amounts of rain erosion at supersonic speeds.

SUMMARY OF THE INVENTION

The general purpose of this invention is to provide a diffuser mechanism having all of the advantages of similarly employed prior art diffusers and having none of the above-described disadvantages.

To attain this, the present invention provides a ducted spike device constructed in such a manner as to cause a bow shockwave—shear layer interaction to occur radially further from the blunt body of the radome, thereby reducing pressure drag on the body. The ducted air through the spike of the invention is bled into a flow shear layer surrounding the blunt body thereby resulting in further reductions in pressure drag. The ducted air exiting from the spike further forms a second shockwave that is normal to the cone of the blunt body. This second shockwave amplifies rain dispersion by starting the vaporization process further from the radome and also deflecting droplets from the blunt body.

OBJECTS OF THE INVENTION

An object of the present invention is to provide a diffuser of simple but effective construction, for use in aircraft or missiles operating at supersonic speeds and which will provide a reduction of drag and protection against rain and hail erosion of a body portion of the aircraft or missile.

Another object of the present invention is to provide means for maintaining a desired flow pattern in a diffuser throughout the normal operating conditions for which the diffuser is designed.

A still further object of the invention is the provision of a flow control means for supersonic velocities which is capable of operation over a wide range of flow conditions.

Other objects and advantages of this invention will become apparent from the teachings of the following detailed description, claims, and the drawings, in which:

DESCRIPTION OF THE PREFERRED EMBODIMENT

Figure 1:
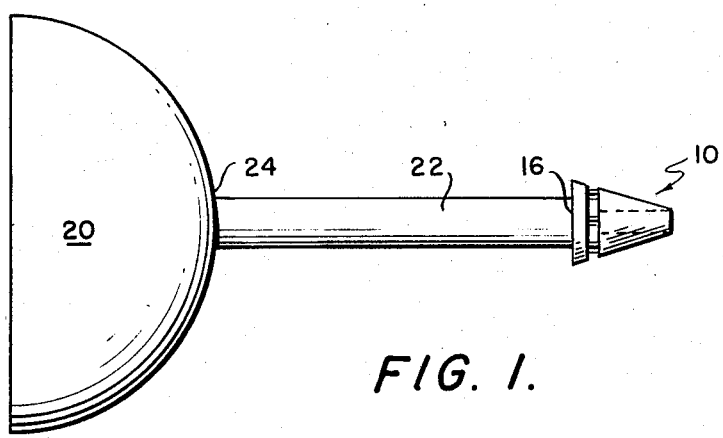
FIG. 1 is an elevation of a blunt body equipped with an embodiment of the diffuser constituting this invention.

Referring in detail to the drawings, FIG. 1 illustrates a diffuser 10 embodying the invention and is hereinafter to be described with reference to exemplary use with a blunt body configuration comprising a radome 20. The diffuser 10 is mounted at 16 on a spike shank 22 extending forwardly of the surface 24 of the radome 20. The shank 22 may be integral with the radome 20 or may be attached to it by some means which renders it easily detachable for service.

Figures 2, 3:
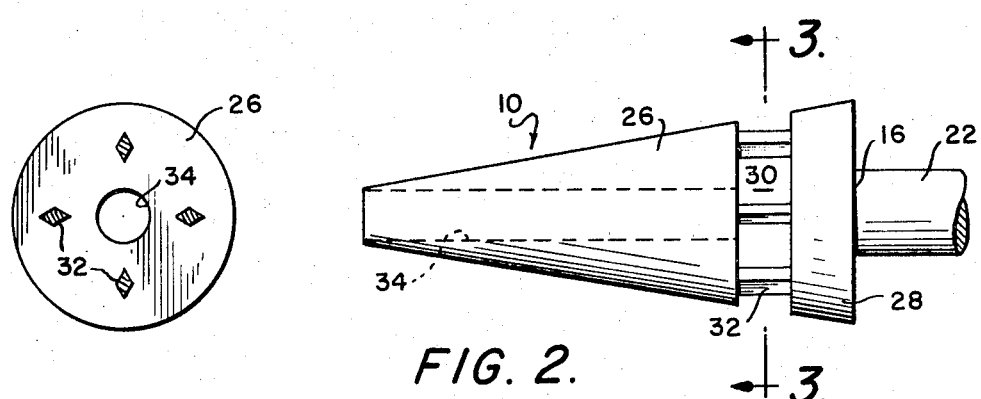
FIG. 2 is an axial detail section of a ducted spike diffuser according to the invention.
FIG. 3 is an end elevation taken along lines 3—3 of FIG. 2.

Referring more particularly to FIGS. 2 and 3, the diffuser 10 is a truncated conical tip comprising a forward portion 26 and an imperforate rearward portion 28. The forward and rearward portions of diffuser 10 are disposed in a spatial relationship, separated by an annular air gap 30. Flexure members 32, preferably having a suitable aerodynamic configuration, are fixedly disposed in supporting relationship between the portions 26 and 28.

The forward portion 26 of the diffuser 10 includes an opening 34 extending axially throughout the entire length of the portion 26 and terminating in the air gap 30. It should be realized that the opening or duct in the diffuser of the invention is for illustrative purposes only and that other modifications of the tip, such as multiple openings or ducts, or a change in the number of flexure members, for example, could be devised without departing from the spirit of the invention.

Figure 4:
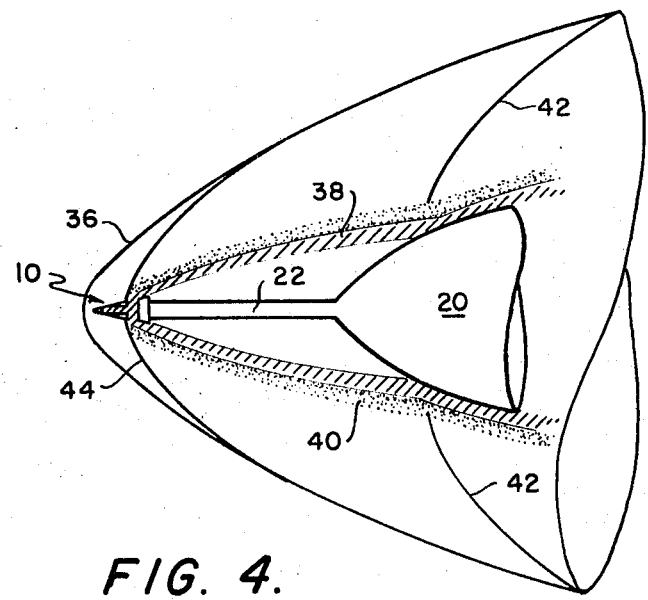
FIG. 4 is a schematic diagram showing the flow conditions existing when the diffuser is in operation.

The schematic airflow diagram illustrated in FIG. 4 shows the diffuser 10 extending into an oncoming supersonic airstream where a bow-tip shockwave 36 commences. The bow-tip shockwave 36 occurs at a detached position slightly forward of the diffuser 10 and continues outward therefrom in the manner shown in FIG. 4.

Air, ducted through the opening 34 in the diffuser portion 26, exits through the airgap 30 in a direction normal to the diffuser at the airgap and forms a separating shear layer 40 about the ducted air stream 38. In practice, the ducting of the air adds mass, and hence additional momentum and energy, to the separating shear layer 40 causing a remnant 42 of the bow-tip shockwave 36 to occur further from the surface of the blunt body 20 than would be possible with the use of an unducted diffuser device. A blunt body equipped with a plain tip or unducted diffuser would receive a remnant shockwave of the bow shockwave at the surface thereof subjecting the body to higher forebody drag and rain erosion characteristics.

With further reference to FIG. 4, the ducted air exiting from the gap 30 will amplify the energy level in the shear layer 40 and also augment the bow-tip shockwave 36 by creating a second shockwave 44 at the air gap 30. This second shockwave also serves to amplify rain dispersion and to generally strengthen the shear layer to provide greater shielding for the radome.

From the foregoing description it has been shown that the invention provides an improved diffuser device for use with blunt body configurations and the like which satisfies the previously stated objects and advantages as well as others apparent from this description.

Of course, it will be recognized that the embodiment described above is illustrative only and that many variations may be made by those skilled in the aerodynamic arts. For example, while nose diffusers for blunt bodies have been discussed, the invention is equally appropriate for side mounted diffusers, though the exact structure would, of course, be modified somewhat. It is therefore understood that the invention may be practiced otherwise than as specifically described.

What is claimed is:

1. A ducted spike diffuser for reducing forebody drag and erosion of blunt bodies operating in a supersonic airstream wherein:
   a spike shank is attached to and extends forwardly from said blunt body; and
   a diffuser is mounted axially on said shank,
   said diffuser having a ducted forward portion and an imperforate spatially disposed rearward portion between said ducted portion and said shank, said rearward portion spaced from said forward portion forming an annular gap therebetween,
   said forward portion provided to duct air therethrough for exiting through said gap.

2. The diffuser of claim 1 wherein said forward and rearward portions comprise a truncated conical tip.

3. The diffuser of claim 2, wherein an opening extends axially through said forward portion, said opening terminating at said airgap.

4. The diffuser of claim 3, wherein air exits said gap in a direction normal to the direction of air ducted through said forward portion.

5. The diffuser of claim 4, wherein said forward and rear portions are supported in a spatial relationship by fixedly disposed aerodynamically shaped members therebetween.

6. The diffuser of claim 5, wherein:
   a bow shockwave—shear layer interaction occurs to reduce pressure drag on said blunt body; and
   air exiting from said gap forms a second shockwave to augment said bow shockwave and deflect rain droplets from said blunt body.

7. The diffuser of claim 6, wherein said blunt body is a radome.

* * * * *